United States Patent [19]

Breher

[11] 4,251,306
[45] Feb. 17, 1981

[54] METHOD OF PRODUCING A REINFORCED ENDLESS TOOTHED BELT HAVING A FABRIC COVER

[75] Inventor: Rudolf Breher, Porta Westfalica, Fed. Rep. of Germany

[73] Assignee: BRECO Kunststoffverarbeitungs-GmbH & Co. KG, Porta Westfalica, Fed. Rep. of Germany

[21] Appl. No.: 3,740

[22] Filed: Jan. 15, 1979

[30] Foreign Application Priority Data

Jan. 14, 1978 [DE] Fed. Rep. of Germany ....... 2801604

[51] Int. Cl.$^3$ .............. B29H 7/22; B32B 31/00; B29C 17/00; B29D 29/00
[52] U.S. Cl. .................................. 156/138; 156/139; 156/140; 156/257; 264/151
[58] Field of Search .............. 156/138, 139, 257, 140, 156/143, 114; 74/231 R; 264/145, 151; 425/115

[56] References Cited

U.S. PATENT DOCUMENTS

| | | | |
|---|---|---|---|
| 3,673,023 | 6/1972 | Ross | 156/257 |
| 3,880,558 | 4/1975 | Breher et al. | 425/115 |
| 3,964,328 | 6/1976 | Redmond, Jr. | 156/140 |
| 4,058,424 | 11/1977 | Breher | 156/140 |
| 4,083,838 | 4/1978 | Breher et al. | 264/145 |

Primary Examiner—John T. Goolkasian
Assistant Examiner—Louis Falasco
Attorney, Agent, or Firm—Becker & Becker, Inc.

[57] ABSTRACT

A method of producing an endless toothed belt of synthetic or plastics material, or similar extrudable material, having a wire- or thread-like reinforcing insert which extends in the circumferential direction of the belt and having a fabric cover covering the toothed side of the belt. A finite belt strand is formed in a closed mold cavity from introduced liquid plastics material and from a fabric strip which is introduced along that shaping surface of the mold cavity which forms the toothed side of the belt strand, thus coating the toothed side of the belt strand with the fabric strip. That side of the belt strand which is remote from the toothed side of the belt is provided with a plurality of grooves extending in the longitudinal direction of the belt strand. The belt strand is then joined at its ends to form an endless ring having its grooved side turned outwardly and having its ends offset laterally relative to one another by the spacing of at least one groove, so that the grooves extend helically on the ring in the circumferential direction thereof. Beginning at one edge of the ring, a reinforcing insert which fits into the grooves is wound into the grooves. The grooved outer side of the ring is then heated in such a manner that, as a result of melting of the plastics material, the reinforcing inserts are fused into the grooves and the grooves are closed to form a smooth outer surface.

2 Claims, 5 Drawing Figures

METHOD OF PRODUCING A REINFORCED ENDLESS TOOTHED BELT HAVING A FABRIC COVER

The present invention relates to a method of producing an endless toothed belt of plastics material or similar extrudable material having a wire- or thread-like reinforcing insert extending in the circumferential direction of the belt. The belt also has a fabric cover covering the toothed side of the belt.

For drive belts of extrudable material, particularly for toothed belts, the plastics material polyurethane is predominantly used. This material is advantageously suited for this purpose because of its resistance to oil, for example, and its rubber-like flexibility and softness over wide temperature ranges. Like rubber, however, polyurethane has a high coefficient of friction which is not necessary for toothed belts, which transmit the driving force not by static friction but by positive cooperation of the toothed belt with toothed wheels. Rather, the usage of polyurethane often leads to the disadvantage that the teeth of the toothed belt engage with too much friction and jerkily in the grooves of toothed wheels, leading to a rough and undesirably noisy running of the toothed belt. In comparison with polyurethane and rubber, the plastics material polyamide (Nylon) is distinguished by a very low coefficient of friction. However, polyamide is too hard as a material for drive belts and is therefore unsuitable. On the other hand, with a fabric cover of polyamide which covers only the toothed side of a toothed belt, an engagement of the teeth of a toothed belt in the grooves of a toothed wheel can be achieved in a manner so that it slides without friction, absorbs shocks, and makes little noise.

It is known to provide or produce reinforced endless toothed belts from vulcanized rubber having a polyamide fabric cover on the toothed side of the belt. In this case, the fabric layer is first inserted on the toothed shaping surface of a vulcanizing mold. Then prefabricated tooth members of vulcanizable rubber are inserted in the gaps between the teeth of the shaping surface, and are then connected to the fabric layer by preliminary vulcanization. A wire- or thread-like reinforcing insert is then wound on the belt layer thus formed. After this, the back of the belt is built up on the wound reinforcing insert, and finally the belt is fully vulcanized. This method of producing a vulcanized rubber toothed belt having an embedded reinforcing insert and having a polyamide fabric cover has the considerable disadvantage that it is very expensive and complicated.

Reinforced toothed belts of plastics material or similar extrudable material are distinguished by being able to be produced simply, economically, and true to shape by injection molding or extruding in a closed mold cavity. Up to now there has not been a usable solution for being able to produce such reinforced plastics material toothed belts having a polyamide fabric cover on the toothed side of the belt and also having an endless closed annular shape. For example, with the method described in German Pat. No. 21 23 902 which corresponds in disclosure to that of U.S. Pat. No. 3,880,558—Breher issued Apr. 29, 1975 and a divisional case thereof, now U.S. Pat. No. 3,999,914-Breher et al issued Dec. 28, 1976, a plastics material toothed belt could be produced with an embedded reinforcing insert and also with a fabric cover on the toothed side of the belt. However, the resulting toothed belt would be a finite belt which could only be made endless with considerable difficulty, particularly with short circumferential belt lengths, by welding the plastics material of its two ends. This belt would have the disadvantage that the wire- or thread-like embedded reinforcing insert would not form a closed ring but would have an interruption at the connecting point of the two belt ends. This would represent a weakening of the tensile strength of the belt which the reinforcing insert is intended to increase. Such a finite toothed belt produced with reinforcing inserts and fabric cover could also not be made endless by the method described in German Offenlegungsschrift No. 26 16 177 which corresponds in disclosure to that of U.S. Pat. No. 4,083,838—Breher et al issued Apr. 11, 1978, because on making it endless by this method, the fabric cover would also be wound in adjacent strips and so would have unwanted and disadvantageous interruptions over the width of the endless made belt.

It is therefore an object of the invention to provide a method for producing an endless toothed belt of plastics material or similar extrudable material having any desired circumferential length of the belt, with the toothed side of the belt being provided with a fabric cover of polyamide or the like, which fabric cover increases the sliding capacity and extends without interruption over the width of the belt, and with the wire- or thread-like embedded reinforcing insert of the belt extending without interruption over the periphery of the belt.

This object, and other objects and advantages of the present invention, will appear more clearly from the following specification in connection with the accompanying drawings, in which.

The method of the present invention is characterized primarily in that: first a finite belt strand is formed in a closed mold cavity from introduced liquid plastics material and an introduced fabric strip which is introduced along that shaping surface of the mold cavity which forms the toothed side of the belt, thus coating the toothed side of the belt with the fabric strip; the back of the belt strand, which is remote from the toothed side of the belt, is provided with a plurality of grooves extending in the longitudinal direction of the belt strand; then the belt strand is joined at its ends to form an endless ring with the back turned outwardly, the two ends being offset laterally relative to one another by the spacing of at least one groove, so that the grooves extend helically on the ring in its circumferential direction; then beginning at one edge of the ring, a reinforcing insert which fits into the grooves is wound in the grooves; and then the back of the ring is heated in such a manner that, as a result of melting of the plastics material, the reinforcing inserts are fused into the grooves and the grooves are closed forming a smooth back surface.

Figure 1:
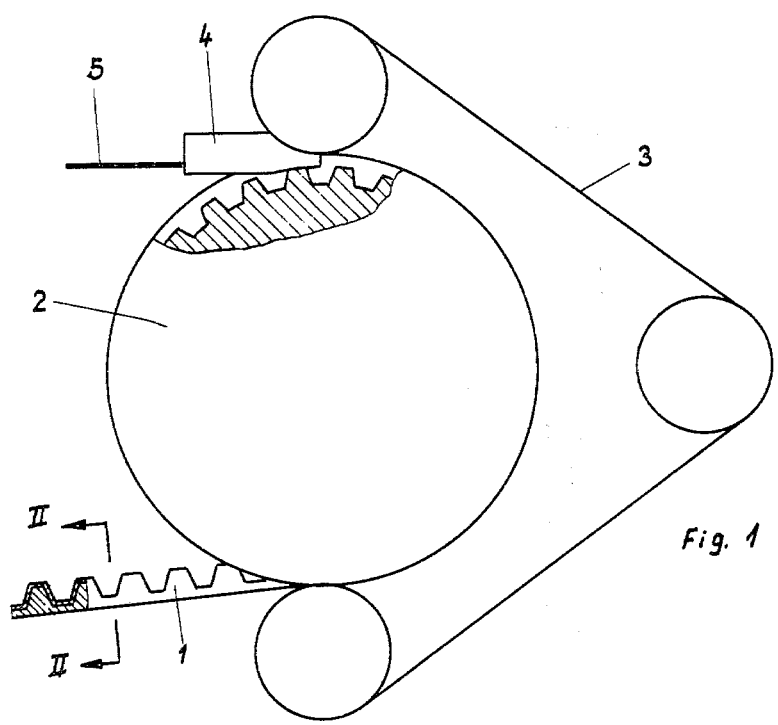
FIG. 1 shows an apparatus for producing the finite belt strand of the present invention.
Figure 2:
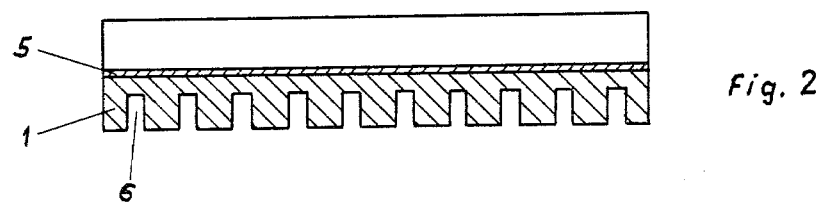
FIG. 2 shows a cross section through the prefabricated belt strand taken along the line II—II in FIG. 1.

Referring now to the drawings in detail, the production of the originally non-reinforced finite belt strand 1 is effected, as illustrated in FIG. 1, in a particularly preferred and advantageous manner using a device based on German Pat. No. 21 23 902 which corresponds in disclosure to that of U.S. Pat. No. 3,880,558—Breher et al issued Apr. 29, 1975 and a divisional case thereof, now U.S. Pat. No. 3,999,914—Breher et al issued Dec. 28, 1979. With this device, a belt strand can be produced continuously with any desired strand length and any desired strand width. For example, a strand width amounting to a multiple of the desired final width of the toothed belt can be produced. For carrying out the method according to the invention, on the one hand liquid synthetic or plastics material is introduced into the mold cavity formed between the toothed mold wheel 2 and the mold strip 3, the beginning of which cavity is closed off by the solidified plastics material end of the nozzle mouthpiece or nozzle 4 of an extruder. The material is introduced at a pressure necessary for the complete filling of the mold cavity and to compensate for the cooling and thereby shrinking plastics material. On the other hand, a fabric strip 5, the width of which corresponds to the strand width of the belt strand, is introduced through the nozzle 4 or through a gap between the nozzle 4 and the mold wheel 2 into the cavity in such a manner that no liquid plastics material can escape through the introduction point of the device for the fabric strip and that the introduced fabric strip rests on the toothed periphery of the mold wheel 2. The fabric strip is pressed into the grooves between the teeth of the mold wheel 2 by the injection pressure of the introduced plastics material, so that the fabric strip 5 is not embedded in the belt strand 1 which emerges from the mold cavity, but forms the surface of the precisely shaped toothed side of the belt strand 1. The belt strand, which in this way is coated or covered with the fabric cover on its toothed side, and which does not yet contain any reinforcing inserts, is provided on its back with a plurality of parallel grooves 6 which extend in the longitudinal direction of the belt strand 1 (FIG. 2). These grooves 6 are each intended to receive a wire- or thread-like reinforcing insert. The depth of the grooves 6 is such that the reinforcing inserts, which are later to be inserted in the grooves 6, lie in the desired plane of the finished toothed belt, namely in the neutral zone thereof. By using a mold strip 3, which has a predetermined number of narrow ribs extending in the longitudinal direction of the mold strip 3 on that side thereof facing the mold cavity, the grooves 6 can be formed on the back of the belt strand 1 simultaneously with the injection molding of the belt strand 1 using the device illustrated in FIG. 1. However, if the belt strand 1, which is coated with the fabric strip 5, is produced with a smooth, unprofiled back in the device illustrated in FIG. 1 or in another device, the grooves 6 can easily and continuously be subsequently cut into the back of the belt strand 1 with a suitable cutting device, or can be rolled in with a heated roller having annular ribs.

The prefabricated belt strand 1 is then cut into a strand length corresponding to the desired peripheral length of the finished toothed belt, and is made endless by bringing together or abutting its two ends. This making endless may advantageously be effected by melting and welding together the ends of the belt strand 1 by means of the welding device illustrated in FIG. 3. The ends of the belt strand 1 are advantageously melted from that toothed side of the belt which is coated with the fabric strip 5 by means of a heated welding plate 7 of the welding device, which is of toothed construction and holds together the ends of the belt strand during the endless making so that the tooth spacing is accurate. A counterplate 8 of the welding device, which plate 8 rests against the back of the belt strand 1, has narrow webs 9 which engage the grooves 6 of the belt strand 1, thereby preventing the grooves 6 from flowing together with molten plastics material. When the ends of the belt strand 1 are brought together to form a ring, the two ends do not necessarily have to be welded together. Rather, at the beginning of the method step which is to be described with reference to FIG. 5, the ends may also be held together in abutment by a first winding of the reinforcing insert laid about the ring, after which the winding of the reinforcing insert is terminated by turning the ring, and, when the grooves are welded closed, the abutting surfaces of the ends of the belt are also welded together at the same time.

Figure 3:
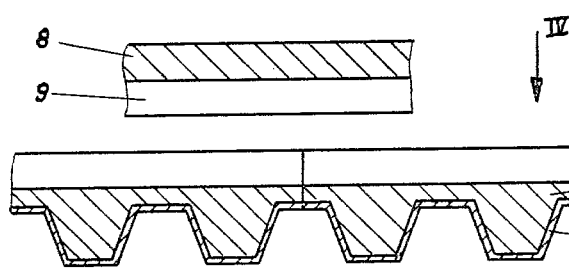
FIG. 3 shows an apparatus for making the belt strand endless by welding together the ends of the strand.
Figure 3:
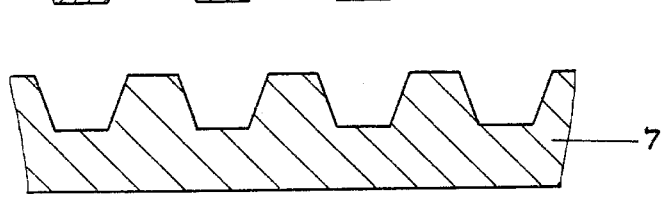
Figure 4:
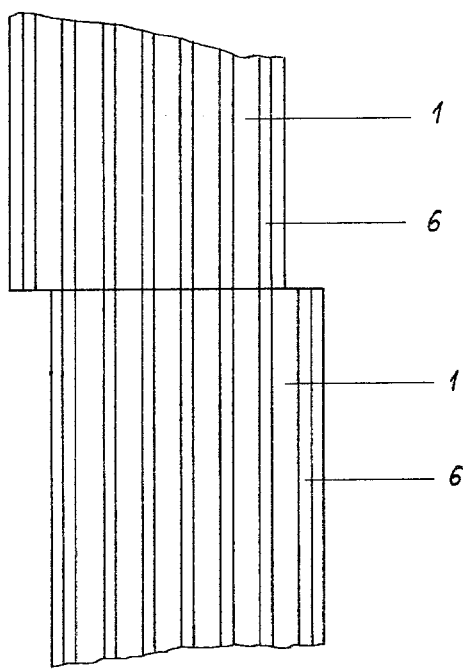
FIG. 4 shows a top view of the joined ends of the belt strand taken in the direction of the arrow IV in FIG. 3.
Figure 5:
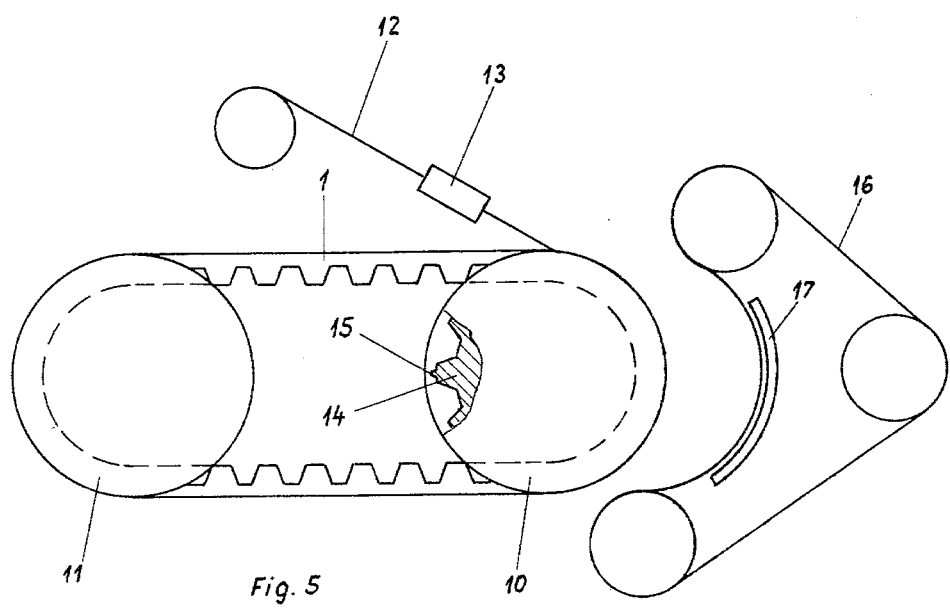
FIG. 5 shows an apparatus for winding the belt strand, which is made endless and has a reinforcing insert, and for fusing the reinforcing insert into the back of the belt.

As illustrated in FIG. 4, during the closing of the belt strand 1 to form a ring, as for example, during welding together of the ends with the device of FIG. 3 or during the described holding together of the ends of the belt strand 1 on the device of FIG. 5 at the same time by means of a first turn of the reinforcing insert, the two ends of the belt strand 1 are offset laterally relative to one another by the spacing of one groove, as a result of which a helical groove results which extends over the periphery of the annularly closed belt strand 1. With grooves 6, which lie very close together, the two ends of the belt strand 1 may, for example, be offset laterally relative to one another by the spacing of two grooves, resulting in two grooves which extend helically. This making of the belt strand 1 endless with ends offset relative to one another accompanied by one or possibly more helical grooves renders it possible to lay a wire- or thread-like reinforcing insert in the grooves 6 by simple winding, as a result of which a pull-resistant belt reinforcement results which is uninterrupted in the circumferential direction of the toothed belt to be produced.

For this purpose, the device illustrated in FIG. 5 can be used in an advantageous manner on the principle of the German Offenlegungsschrift 26 16 177. The belt strand 1, which is brought together or closed to form an endless ring, is laid, with its back turned outwards, on the toothed mold wheel 10 and the preferably likewise toothed tensioning wheel 11 of the apparatus. The distance of the tensioning wheel 11 from the mold wheel 10 is adjustable as a function of the peripheral length of the ring. While turning the mold wheel 10 and the tensioning wheel 11, a reinforcing insert 12 which fits into the grooves 6 is then wound in the helical grooves 6, beginning at one edge of the closed annular belt strand 1. Preferably, the reinforcing insert 12 is in this connection heated, for example by resistance heating in a wire guide 13 or by hot air, and is wound, in the heated state, in the helically extending grooves 6 of the belt strand 1 which has been brought together to form an endless ring. This has the advantage that the reinforcing insert wound in the grooves 6 begins to melt the plastics material of the belt strand 1 and is wound in the grooves 6 without unnecessarily high winding tension and can penetrate into the grooves 6 in the region of the grooves between the teeth of the belt strand 1 until it comes into contact with the fabric cover 5, so that the reinforcing insert 12 is supported by the fabric cover 5 at a uniform radial distance from the teeth of the toothed mold wheel 10, and thus lies precisely in the desired plane in the cross section of the belt. If desired, the mold wheel 10, as in the device according to the German Offenlegungsschrift No. 26 16 177 which corresponds in disclosure to that of U.S. Pat. No. 4,083,838—Breher issued Apr. 11, 1978, may comprise narrow rib-shaped winding projections 15 on the head faces of its teeth 14 in order, by means of the fabric cover 5 situated between the winding projections 15 and the reinforcing insert 12, to support the reinforcing insert 12 at a specific distance from the head faces of the teeth 14 of the mold wheel 10.

After termination of the helical winding of the reinforcing insert 12 in the grooves 6, the mold strip 16, which belongs to this device in the manner of German Offenlegungsschrift No. 26 16 177 which corresponds in disclosure to that of U.S. Pat. No. 4,083,838—Breher issued Apr. 11, 1978, is brought up to the mold wheel 10 and laid on the back of the belt strand 1. While the mold wheel 10 with the belt strand 1 is again set in rotation, the mold strip 16 is heated by means of a heating device 17 in the region of contact with the back of the belt strand 1. As a result, the back of the belt strand or of the ring 1 is now partially melted, so that the reinforcing inserts 12 are fused into the grooves 6 by penetrating plastics material, and the grooves 6 are closed forming a smooth back surface of the finished reinforced endless toothed belt. If the ends of the belt strand 1 have not yet been welded to one another, for example by means of the welding device of FIG. 3, the ends are fused together during this last method step.

If desired, the finished toothed belt can be cut into narrower toothed-belt rings, which then each have a reinforcing insert which is interrupted in the transverse direction. FIG. 4 diagrammatically shows the lateral offsetting of the ends of the belt strand during the endless making. In practice, the groove spacing is much narrower, and accordingly the lateral offsetting of the ends of the belt strand is much less, so that it practically does not matter and is insignificant that the edges of the belt strand jump laterally by the spacing of one groove at the point where the ends of the belt are brought together. If desired, however, the edges of the finished toothed belt can also easily be trimmed to remove the slight lateral jump completely.

The present invention is, of course, in no way restricted to the specific disclosure of the drawings, but also encompasses any modifications within the scope of the appended claims.

What I claim is:

1. A method of producing an endless toothed belt of synthetic material having a filiform reinforcing insert extending in the circumferential direction of the belt and having a fabric cover covering the toothed side of the belt, said method comprising in combination the steps of:

introducing synthetic material into a closed mold cavity;

simultaneously also introducing a fabric strip into said cavity along that shaping surface thereof designed to form the toothed inner side of the belt;

forming a finite toothed belt strand in said mold cavity from said synthetic material and said fabric strip being brought together in securely connected relationship, said fabric strip coating the toothed inner side of said belt strand;

providing the outer side of said belt strand, which outer side is remote from said toothed side, with a plurality of grooves extending in the longitudinal direction of said belt strand;

joining the ends of said belt strand to form an endless ring having its grooved side turned outwardly and having its ends offset laterally relative to one another by the spacing of at least one groove, so that said grooves extend somewhat helically on said ring substantially in the circumferential direction thereof;

starting at one edge of said ring, winding into said grooves a reinforcing insert which fits therein; and heating the grooved outer side of said ring in such a way as to bring about progressively melting of said synthetic material, fusing of said reinforcing inserts into said grooves, and closing of said grooves to form a substantially smooth outer surface and finished toothed belt ring.

2. A method according to claim 1, which includes in combination therewith the step of additionally heating said reinforcing insert prior to said winding thereof into said grooves.

* * * * *